United States Patent
Hahn et al.

(10) Patent No.: US 7,634,249 B2
(45) Date of Patent: Dec. 15, 2009

(54) METHOD AND DEVICE FOR AUTHENTICATING A SUBSCRIBER FOR UTILIZING SERVICES IN A WIRELESS LAN WHILE USING AN IP MULTIMEDIA SUBSYSTEM OF A MOBILE RADIO NETWORK

(75) Inventors: Wolfgang Hahn, Bergfelde (DE); Johann Reitter, Berg im Attergau (AT)

(73) Assignee: Siemens Aktiengesellschaft, Munich (DE)

( * ) Notice: Subject to any disclaimer, the term of this patent is extended or adjusted under 35 U.S.C. 154(b) by 650 days.

(21) Appl. No.: 10/516,534

(22) PCT Filed: Jun. 7, 2002

(86) PCT No.: PCT/EP02/06269

§ 371 (c)(1),
(2), (4) Date: Dec. 2, 2004

(87) PCT Pub. No.: WO03/105436

PCT Pub. Date: Dec. 18, 2003

(65) Prior Publication Data

US 2005/0181764 A1    Aug. 18, 2005

(51) Int. Cl.
*H04M 1/68*    (2006.01)
*H04M 3/16*    (2006.01)
(52) U.S. Cl. .................. 455/403; 370/338; 455/411; 455/435.1
(58) Field of Classification Search ............ 370/236, 370/338, 395.3, 395.5, 395.52, 235, 401; 455/410–411
See application file for complete search history.

(56) References Cited

U.S. PATENT DOCUMENTS

| 5,708,655 | A | 1/1998 | Toth et al. |
| 6,466,571 | B1 * | 10/2002 | Dynarski et al. ............ 370/352 |
| 6,973,086 | B2 * | 12/2005 | Patil et al. ................... 370/392 |
| 2002/0062379 | A1 | 5/2002 | Widegren et al. |
| 2002/0136226 | A1 * | 9/2002 | Christoffel et al. .......... 370/401 |

(Continued)

FOREIGN PATENT DOCUMENTS

EP    0 483 547 A1    5/1992

(Continued)

OTHER PUBLICATIONS

SIP: Session Initiation Protocol, Network Working Group, Request for Comments, 2543, Standards Track, Mar. 1999.

(Continued)

*Primary Examiner*—Simon D Nguyen
(74) *Attorney, Agent, or Firm*—King & Spalding L.L.P.

(57) ABSTRACT

An efficient authentication is made possible by a method for authenticating a subscriber MT (6) for utilizing services in a wireless LAN (WLAN) (10) while using an IP multimedia subsystem (IMS) (3). The inventive method is characterized in that a subscriber MT (6), who is to be authenticated and who is located at a location having WLAN coverage, receives an IP address from the WLAN (10) in an attributed manner, after which the subscriber authenticates himself with regard to the IP multimedia subsystem (3) while giving this IP address. In addition, an element ((WAGW (2))) of the WLAN (10) is informed of the result of the authentication of the subscriber MT (6) with regard to the IMS (3).

26 Claims, 4 Drawing Sheets

U.S. PATENT DOCUMENTS

| | | | | |
|---|---|---|---|---|
| 2003/0027595 | A1* | 2/2003 | Ejzak | 455/560 |
| 2003/0169713 | A1* | 9/2003 | Luo | 370/338 |
| 2003/0169714 | A1* | 9/2003 | Nakajima | 370/338 |
| 2004/0022212 | A1* | 2/2004 | Chowdhury et al. | 370/329 |
| 2004/0102182 | A1* | 5/2004 | Reith et al. | 455/410 |
| 2004/0152446 | A1* | 8/2004 | Saunders et al. | 455/411 |
| 2004/0243710 | A1* | 12/2004 | Mao | 709/227 |
| 2006/0052085 | A1* | 3/2006 | Gregrio Rodriguez et al. | 455/411 |
| 2006/0073811 | A1* | 4/2006 | Ekberg | 455/411 |

FOREIGN PATENT DOCUMENTS

| | | |
|---|---|---|
| EP | 1 191 763 A2 | 3/2002 |
| WO | WO-97/40615 A2 | 10/1997 |
| WO | WO-98/32301 A1 | 7/1998 |
| WO | WO-9960742 | 11/1999 |
| WO | WO-00/76249 A1 | 12/2000 |
| WO | WO-0172057 A2 | 9/2001 |
| WO | WO-0178430 A1 | 10/2001 |
| WO | WO-01/91389 A2 | 11/2001 |
| WO | WO-01/91419 A1 | 11/2001 |
| WO | WO-0215627 A1 | 2/2002 |

OTHER PUBLICATIONS

SIP: Session Initiation Protocol, Network Working Group, Request for Comments, 3261, Category: Standards Track, Jun. 2002.

3rd Generation Partnership Project, Technical Specification Group Services and System Aspects; Service Requirements for the IP Multimedia Core Network Subsystem (Stage 1); 3G TS 22.228 V1.0.0 (Sep. 2000).

3rd Generation Partnership Project: Technical Specification Group Services and System Aspects; IP Multimedia (IM) Subsystem—Stage 2, 3G TS 23.228 V1.4.0 (Nov. 2000).

3rd Generation Partnership Project; Technical Specification Group Services and System Aspects; IP Multimedia (IM) Subsystem—Stage 2, 3G TS 23.228 V1.7.0 (Feb. 2001).

3rd Generation Partnership Project; Technical Specification Group Services and System Aspects; IP Multimedia Subsystem (IMS); Stage 2, (Release 5), 3GPP TS 23.228 V.5.2.0 (Oct. 2001).

3rd Generation Partnership Project; Technical Specification Group Services and System Aspects; IP Multimedia Subsystem (IMS); Stage 2, (Release 5), 3GPP TS 23.228 V5.3.0 (Jan. 2002).

3rd Generation Partnership Project; Technical Specification Group Services and System Aspects; IP Multimedia Subsystem (IMS); Stage 2 (Release 5), 3GPP TS 23.228 V5.4.0 (Mar. 2002).

3rd Generation Partnership Project; Technical Specification Group Services and System Aspects; IP Multimedia Subsystem (IMS); Stage 2, (Releae 5), 3GPP TS 23.228 V5.4.1 (Apr. 2002).

3rd Generation Partnership Project; Technical Specification Group Services and System Aspects; IP Multimedia Subsystem (IMS); Stage 2, (Release 5), 3GPP TS 23.228 V5.5.0 (Jun. 2002).

3rd Generation Partnership Project; Technical Specification Group Services and System Aspects; Architecture Principles for Release 2000 (Release 2000) 3G TR 23.821 V1.0.1 (Jul. 2000).

Digital Cellular Telecommunications System (Phase 2+) (GSM); Universal Mobile Telecommunications Systems (UMTS); Network Architecture (3GPP TS 23.002 Version 5.6.0 Release 5), (Mar. 2002).

"Billing in Wireless LAN Hotspots" by Frank Ostrowski, Funkschau, Sep. 2002, pp. 14-16., with English translation.

* cited by examiner

METHOD AND DEVICE FOR AUTHENTICATING A SUBSCRIBER FOR UTILIZING SERVICES IN A WIRELESS LAN WHILE USING AN IP MULTIMEDIA SUBSYSTEM OF A MOBILE RADIO NETWORK

CLAIM FOR PRIORITY

This application is a national stage of PCT/EP02/06269, published in the German language on Dec. 18, 2003, which was filed on Jun. 7, 2002.

TECHNICAL FIELD OF THE INVENTION

The invention relates to a method and device for authenticating a subscriber for utilizing services in a wireless LAN while using an IP multimedia subsystem of a mobile radio network.

BACKGROUND OF THE INVENTION

A method for authenticating WLAN subscribers in a mobile radio network is described in the journal "Funkschau", issued September 2002, pages 14-15, namely authentication via a NAI (Network Access Identifier) and optionally via a SIM card, and authentication using the IPv6 (Internet Protocol Version 6) and a so-called SIM-6 mechanism. In general, authentication of a wireless LAN subscriber is effected via an HTTP protocol.

WO 00/76249 A1 describes a method of authorizing an Internet protocol-enabled mobile device to access the Internet via a wireless LAN (WLAN), GSM or UMTS network, whereby the transmission of an IP access request is initiated from the mobile device to an IP router via the access network. In response to receipt of the access request at the IP router, an IP address routing prefix is sent from the IP router to the mobile device. The IP router then only forwards IP packets to the mobile device if it has first received an authorization message from a control point. The control point monitors the payment (electronic cash) from the mobile device for use of the Internet.

US 2002/0062379 A1 describes the setting up of a multimedia session involving a mobile device with a session packet access bearer, which is established between the mobile device and an access point to a packet data network via a radio access network. The access point is connected to a multimedia system that supports multimedia session services. Using the session packet access bearer, a multimedia session that includes a plurality of media data streams is initiated in a mobile device. Media packet access bearers are established between the mobile device and the access point.

SUMMARY OF THE INVENTION

The invention authenticates a subscriber of a wireless LAN who is also a mobile radio network subscriber, while utilizing services in a mobile radio network.

Authentication, while using an IP multimedia subsystem, according to one embodiment of the invention, has the advantage that a subscriber is authenticated for any services that can be reached via the wireless LAN, without the installation of a separate server for authentication in the wireless LAN and without separate connection to a corresponding entity in the mobile radio network (e.g. HLR/HSS), which must be contacted by means of a connection (interface) especially provided for that purpose.

BRIEF DESCRIPTION OF THE INVENTION

The invention is explained in greater detail with the reference to exemplary embodiments illustrated in the Figures, in which.

DETAILED DESCRIPTION OF THE INVENTION

Figure 1:
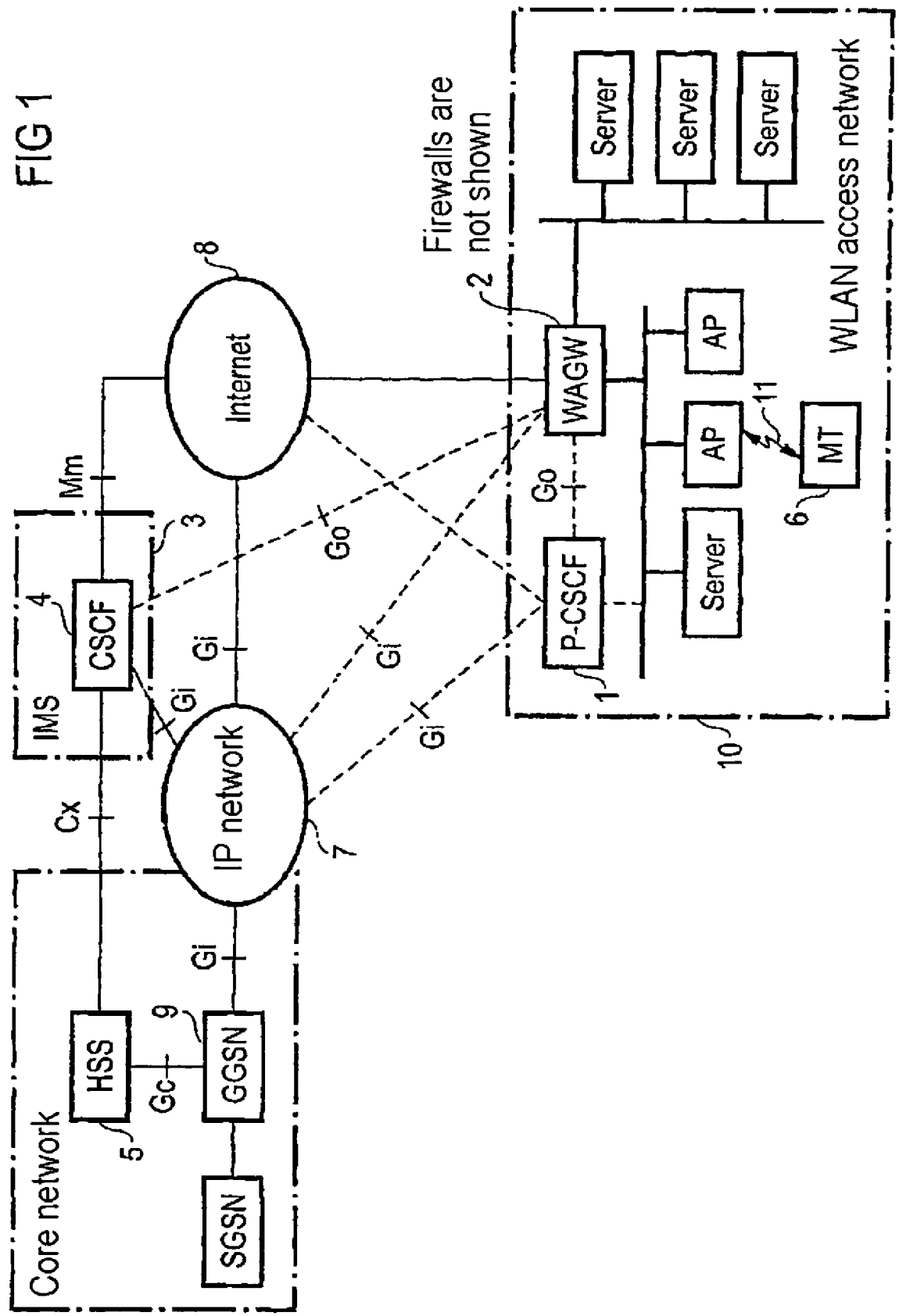
FIG. 1 shows the architecture with the interfaces between a wireless LAN and an IP multimedia subsystem.

FIG. 1 shows how the wireless LAN is connected to an IP multimedia subsystem (IMS) (3). A subscriber MT (6) of a wireless LAN (10) is connected via a radio interface (11) to the wireless LAN at a location having wireless LAN coverage (hotspot). For the authentication, the subscriber MT (6) receives an IP address (e.g. through DHCP) from the proxy call state control function node (P-CSCF) (1). The subscriber MT (6) can thus authenticate himself, by means of a session initiation protocol (SIP) registration, in the IMS (3) without any prior bearer level authentication (e.g. H/2, authentication via the radio interface is optional). In the IMS (3), the authentication takes place on the application side in the call state control function node (CSCF) (4) via an SIP registration message. This authentication guarantees the MT (6) access to specific profiles (e.g. WLAN profiles). The CSCF (4) uses an authentication that is known per se for the IMS (3), but not for a WLAN (10), by means of the home subscriber system (HSS) (5) via the Cx interface. The P-CSCF (1) of the WLAN (10) receives the result of the authentication via an SIP registration request (e.g. 200 OK). This result is transferred to the WLAN access gateway (WAGW) (2). The WAGW (2) controls the access to services and monitors the successful authentication in the IMS (3). The wireless LAN (10) is connected to the Gi interface or Mm interface with the IMS (3). The Gi interface is an interface within the IP network (7) and is thus subject to special security precautions. The geographical distance between the IMS (3) and the location having WLAN coverage is also taken into account. At the Mm interface, the connection between the IMS (3) and the location having WLAN coverage (hotspot) is effected via an IP multimedia network (Internet) (8).

The authentication of an MT (6) in the IMS (3) is carried out using the SIP protocol. The result of the authentication in the IMS (3) is fed to the WAGW (2). There are three options for this, which are described under FIG. 2, FIG. 3 and FIG. 4.

Figure 2:
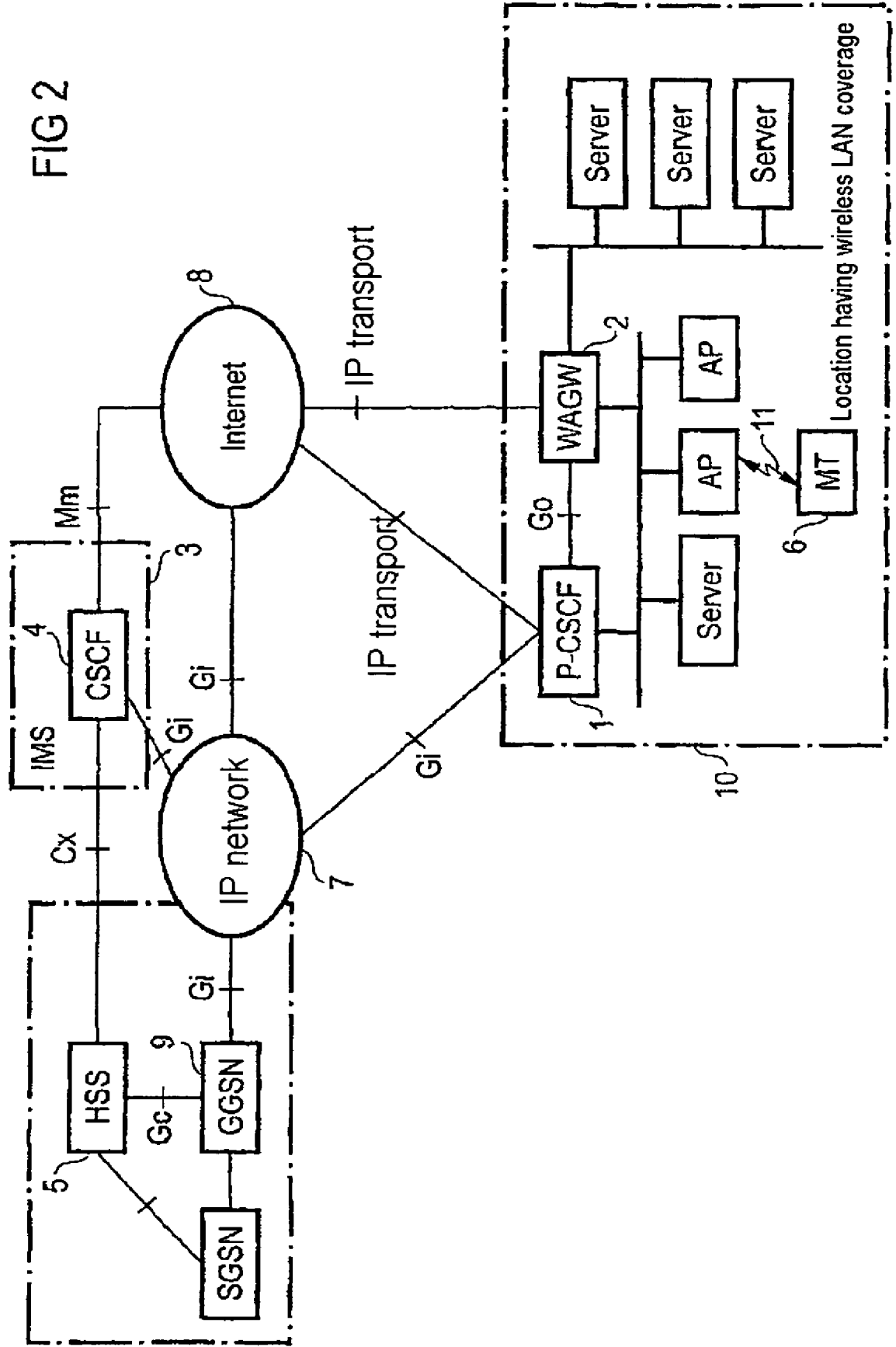
FIG. 2 shows how the WAGW obtains the authentication result using a separate P-CSCF/policy control function at the location having WLAN coverage.

FIG. 2 shows how the WAGW (2) receives the authentication result through a separate P-CSCF (1)/policy control function at the location having WLAN coverage (hotspot). In this case the WLAN (10) is equipped with its own P-CSCF (1), which is used for forwarding SIP messages to the corresponding entity in the IMS (3) (SIP registration request) and controlling the WAGW (2) according to the authentication result of the IP multimedia subsystem (IMS) (SIP response). The P-CSCF (1) communicates with the CSCF (4) in the IP multimedia subsystem via a Gi interface or Mm interface (via Internet (8)). The P-CSCF (1) provides the WAGW (2), on the basis of the result of the authentication (SIP registration) in the IMS (3), with instructions on how the data traffic of an MT (6) is to be handled by the WAGW (2). This enables the WAGW (2) to block the data flow, for example. By means of the policy control function, the P-CSCF(1) controls the data traffic through the WAGW (2), and is able to grant, restrict, increase or decline the quantity and quality of the data flow of an MT (6) through the WAGW (2). This mechanism is similar to the Go interface which is installed between the P-CSCF of the IMS (3) and the gateway GPRS support node (GGSN) (9). This policy control function may be part of the P-CSCF(1) or may even be a separate unit, which may optionally be used in addition for the IP multimedia subsystem and the PS domains.

One possible policy protocol is COPS (RFC 2748, used for the Go interface). The Go interface uses an IP transport, and therefore a protected transfer of COPS messages within the wireless LAN, or a separate connection (i.e. separated from data traffic of subscribers within the wireless LAN) between P-CSCF(1) and WAGW (2,) is installed during implementation.

Figure 3:
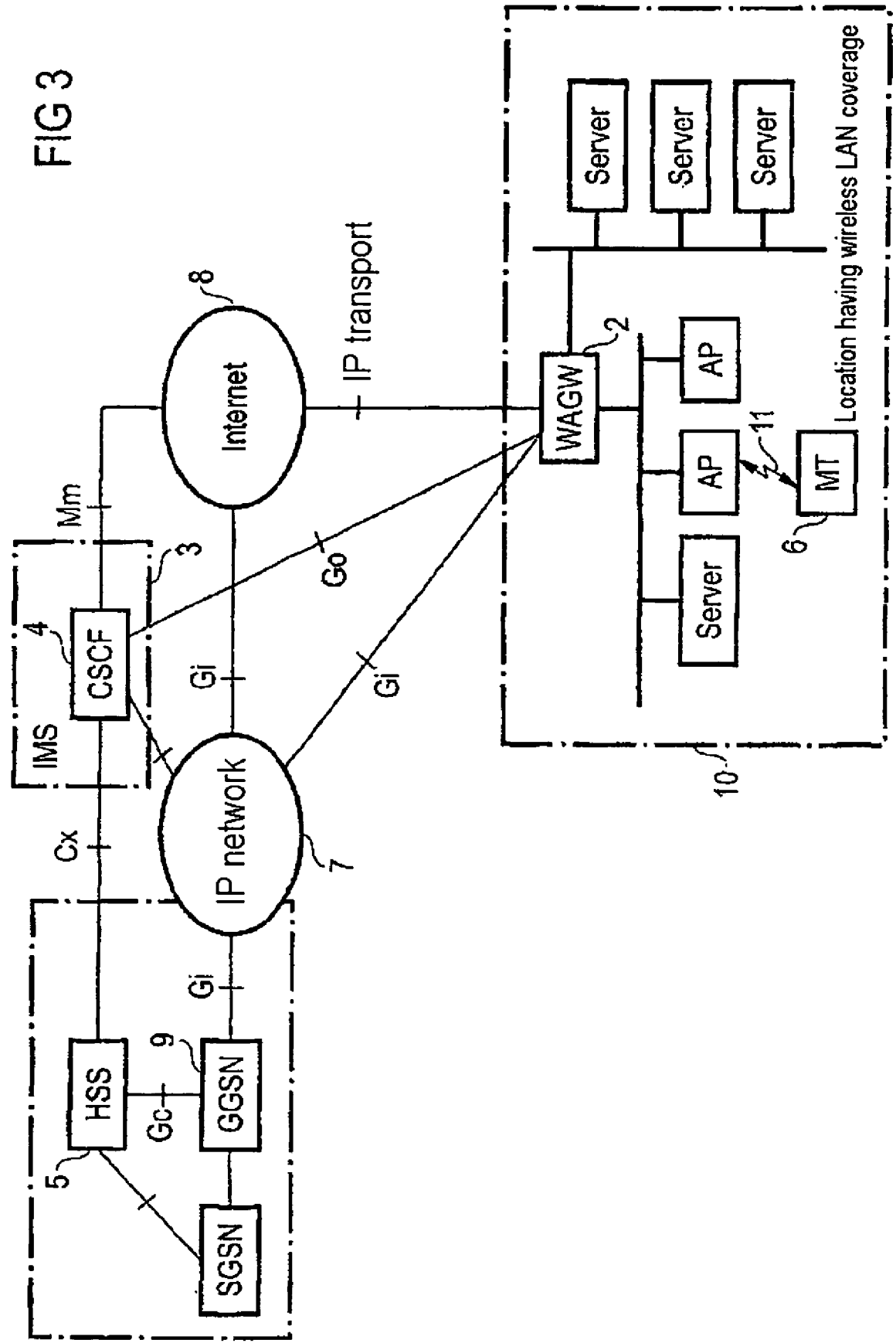
FIG. 3 shows how the WAGW obtains the authentication result through the P-CSCF/policy control function of the IP multimedia subsystem.

FIG. 3 shows how the WAGW (2) is notified of the result of the IMS authentication by the CSCF (4) of the IMS (3). The CSCF (4) of the IMS (3) controls the WAGW (2) with the effect that it exercises policy functionality. Here, however, it is the P-CSCF of the IMS (3) that exercises control of the WAGW (2), instead of a separate P-CSCF in the wireless LAN.

By means of the policy functionality, the P-CSCF of the IMS (3) controls the data traffic through the WAGW (2) and is able to grant, restrict, increase or decline the quantity and quality of the data flow of the MT (6) through the WAGW (2). This mechanism is similar to the one in the Go interface which is installed between the P-CSCF of the IMS (3) and the GGSN of the PS domains. A Go interface is installed between the CSCF (4) of the IMS (3) and the WAGW (2) of the wireless LANs (10) to ensure that data transfer is protected. The WAGW (2) can transmit the SIP messages containing the authentication result via the Gi interface or via the Mm interface to the CSCF (4) in the IMS (3).

Figure 4:
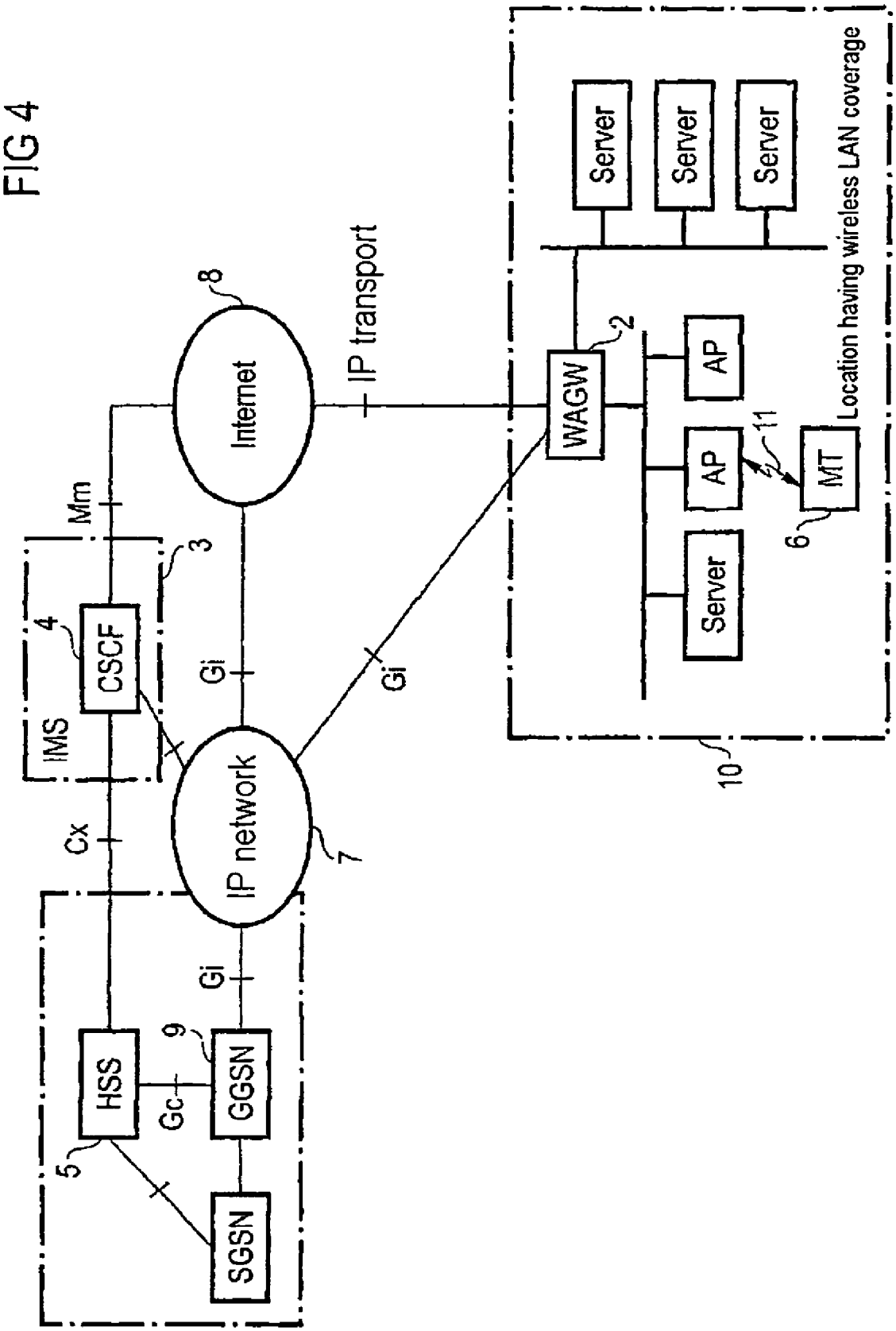
FIG. 4 shows how the WAGW learns the authentication result by expanded functionalities.

FIG. 4 shows how the WAGW (2) itself evaluates the authentication result. The WAGW (2) receives the result, which indicates whether an authentication of the MT (6) has taken place in the IMS (3), and the result of this authentication. The WAGW (2) then converts the result by allowing subscriber data to pass through completely or with restrictions. If the WAGW (2) is equipped with a Gi interface, it can transmit authentication messages (SIP registration) via this interface to the CSCF (4) in the IMS (3). Otherwise the Mm interface is used for this purpose. To enable the WAGW (2) to evaluate the result of the authentication (SIP messages), it is implemented in the form of an "application layer gateway". In this way it can convert the result of an SIP authentication accordingly without the assistance of a CSCF (4). The WAGW (2) does this by searching the data packets for SIP messages (registration requests and responses) and interpreting the SIP registration responses accordingly for the filtering of subscriber data. So that the WAGW (2) does not have to open every data packet, a process of elimination is carried out on OSI Layer 3 (IP address) or OSI Layer 4 (port number). Thus an IP address, a port number or other eliminating factor is used to determine whether a data packet or datagram is forwarded to the next higher OSI layer, or whether it may pass through the WAGW (2).

The invention claimed is:

1. A method for authenticating a subscriber for utilizing services in a wireless LAN while using an IP multimedia subsystem of a mobile radio network, comprising:

receiving an IP address by the subscriber from the wireless LAN, using the IP address by the subscriber to authenticate the subscriber to the IP multimedia subsystem of the mobile radio network by means of a session initiation protocol (SIP) registration; and informing an element of the wireless LAN of the result of the authentication of the subscriber with regard to the IP multimedia subsystem.

2. The method according to claim 1, wherein the authentication of the subscriber of the wireless LAN in the IP multimedia subsystem is is performed using a home subscriber system.

3. The method according to claim 2, wherein the subscriber transmits, via the wireless LAN, an SIP register message to a device of the IP multimedia system, which transmits a request for authentication of the IP multimedia subsystem subscriber to the home subscriber system, after which the home subscriber system authenticates the subscriber and communicates the result of the authentication to the wireless LAN access gateway.

4. The method according to claim 1, wherein the subscriber in the wireless LAN in the IP multimedia subsystem is authenticated while using an authentication server.

5. The method according to claim 1, wherein an association is implemented between the subscriber terminal and the wireless LAN for transmitting and receiving via the radio interface between subscriber and wireless LAN.

6. The method according to claim 1, wherein the subscriber terminal receives the IP address from an address area of the wireless LAN, with which together with other IP transport-based data transmits and receives SIP messages that transport authentication messages from and to the IP multimedia subsystem.

7. The method according to claim 1, wherein access to services is controlled via the wireless LAN access gateway, which monitors successful authentication in the IP multimedia subsystem.

8. The method according to claim 7, wherein the wireless LAN has a proxy-call state control function node which forwards the SIP messages to a corresponding entity in the IP multimedia subsystem and controls the WLAN access gateway with regard to the authentication result of the IP multimedia subsystem.

9. The method according to claim 7, wherein instructions are provided to the WLAN access gateway based on a result of the authentication in the IP multimedia subsystem as to how data traffic of a subscriber is to be handled by the wireless LAN access gateway.

10. The method according to claim 9, wherein the proxy-call state control function controls the data traffic through the wireless LAN access gateway and grants, restricts, increases or declines a quantity and/or quality of the data flow of a subscriber through the wireless LAN access gateway.

11. The method according to claim 10, wherein the policy control function is part of the proxy-call state control function node.

12. The method according to claim 10, wherein a Go interface is installed between the call state control function node of the IP multimedia subsystem and the wireless LAN access gateway for protected data transfer.

13. The method according to claim 10, wherein the evaluation of the authentication result is implemented using an application layer gateway.

14. The method according to claim 9, wherein the result of the authentication is fed to the wireless LAN access gateway by the call state control function/policy control function in the IP multimedia subsystem.

15. The method according to claim 9, wherein the call state control function node of the IP multimedia subsystem controls the wireless LAN access gateway with regard to the authentication result of the IP multimedia subsystem.

16. The method according to claim 15, wherein the authentication result received from the IP multimedia subsystem is converted by the wireless LAN access gateway, wherein the WLAN access gateway allows subscriber data to pass there through.

17. The method according to claim 1, wherein the wireless LAN is connected to the IP multimedia subsystem via a Gi interface.

18. The method according to claim 1, wherein the wireless LAN is connected to the IP multimedia subsystem via an Mm interface.

19. The method according to claim 1, wherein a result of the authentication is fed to a wireless LAN access gateway by a proxy-call state control function/policy control function at a location having wireless LAN coverage.

20. The method according to claim 1, wherein an authentication result is evaluated by expanded functionalities in the wireless LAN access gateway.

21. The method according to claim 1, wherein the subscriber of the wireless LAN is also a subscriber of the mobile communication network.

22. The method according to claim 1, wherein
the wireless LAN network is integrated into mobile communication networks with aid of ETSI HiperLan and IEEE 802.11.

23. A device for authenticating a subscriber for utilizing services in a wireless LAN with aid of an IP multimedia subsystem of a mobile radio network, comprising:
an IP multimedia system for authenticating a subscriber to be authenticated by means of a session initiation protocol (SIP) registration, and located at a location having wireless LAN coverage, by giving an IP address allocated by the wireless LAN; and
an IP multimedia subsystem for informing an element of the wireless LAN of a result of the authentication of the subscriber with regard to the IP multimedia subsystem.

24. The device according to claim 23, wherein the wireless LAN comprises a first device constituting a proxy call state control function node, wherein the first device is a node in the wireless LAN.

25. The device according to claim 24, wherein the first constituting the proxy call state control function node of the IP multimedia subsystem is provided for controlling authentication in the wireless LAN.

26. The device according to claim 25, wherein the wireless LAN access gateway has a second device that is configured such that the device converts the authentication result which is received from the IP multimedia subsystem, by allowing subscriber data to pass there through.

\* \* \* \* \*